United States Patent
Thomet

(10) Patent No.: US 11,624,939 B2
(45) Date of Patent: Apr. 11, 2023

(54) AUTOMATIC ESTABLISHMENT OF PARAMETERS NECESSARY FOR CONSTRUCTING SPECTACLES

(71) Applicant: INTERACTIF VISUEL SYSTEME (I V S), Clichy (FR)

(72) Inventor: Pascal Thomet, Paris (FR)

(73) Assignee: INTERACTIF VISUEL SYSTEME (I V S)

(*) Notice: Subject to any disclaimer, the term of this patent is extended or adjusted under 35 U.S.C. 154(b) by 0 days.

(21) Appl. No.: 17/278,867

(22) PCT Filed: Sep. 24, 2019

(86) PCT No.: PCT/EP2019/075754
§ 371 (c)(1),
(2) Date: Mar. 23, 2021

(87) PCT Pub. No.: WO2020/064763
PCT Pub. Date: Apr. 2, 2020

(65) Prior Publication Data
US 2022/0050311 A1 Feb. 17, 2022

(30) Foreign Application Priority Data
Sep. 24, 2018 (FR) ...................................... 1858644

(51) Int. Cl.
*G06K 9/62* (2022.01)
*G02C 13/00* (2006.01)
*G06T 7/00* (2017.01)

(52) U.S. Cl.
CPC ......... *G02C 13/003* (2013.01); *G06K 9/6215* (2013.01); *G06T 7/0014* (2013.01); *G06T 2207/30204* (2013.01)

(58) Field of Classification Search
CPC .... G02C 13/003; G06K 9/6215; G06T 7/0014
See application file for complete search history.

(56) References Cited

U.S. PATENT DOCUMENTS

| 4,653,881 A | 3/1987 | Joncour |
| 5,617,155 A | 4/1997 | Ducarouge et al. |

(Continued)

FOREIGN PATENT DOCUMENTS

| CN | 105678391 A | 6/2016 |
| CN | 107250719 A | 10/2017 |

(Continued)

OTHER PUBLICATIONS

French Search Report for Application No. 1858644 dated May 28, 2019, pp. 1-3.

(Continued)

*Primary Examiner* — Sam Bhattacharya
(74) *Attorney, Agent, or Firm* — Lerner, David, Littenberg, Krumholz & Mentlik, LLP

(57) ABSTRACT

The invention relates to a method for automatically establishing parameters in order to centre and/or personalise corrective lenses for spectacles, comprising the following steps: —taking images of the frame from different viewing angles, —defining an initial model of the frame in a reference system based on a set of predefined initial parameters, projecting a region of interests in the images, —comparing the projections and evaluating a similarity between said projections, —modifying at least one of the parameters of the model and reiterating the steps until a maximum level of similarity between the projections is obtained, —deducing the at least one of the parameters from the model associated with the projections which have the maximum level of similarity.

17 Claims, 5 Drawing Sheets

(56) References Cited

U.S. PATENT DOCUMENTS

| 2006/0193493 | A1 | 8/2006 | Ruch |
| 2008/0200841 | A1 | 8/2008 | Di Mascio et al. |
| 2009/0021693 | A1 | 1/2009 | Sessner et al. |
| 2010/0128220 | A1 | 5/2010 | Chauveau |
| 2015/0015848 | A1 | 1/2015 | Haddadi et al. |
| 2016/0162965 | A1 | 6/2016 | Lee et al. |

FOREIGN PATENT DOCUMENTS

| DE | 102013010684 A1 | 12/2014 |
| EP | 3270098 B2 | 12/2022 |
| FR | 2719463 A1 | 11/1995 |
| FR | 2857771 A1 | 1/2005 |
| WO | 2006092479 A1 | 9/2006 |

OTHER PUBLICATIONS

International Search Report including Written Opinion for Application No. PCT/EP2019/075754 dated Jan. 7, 2020, pp. 1-12.

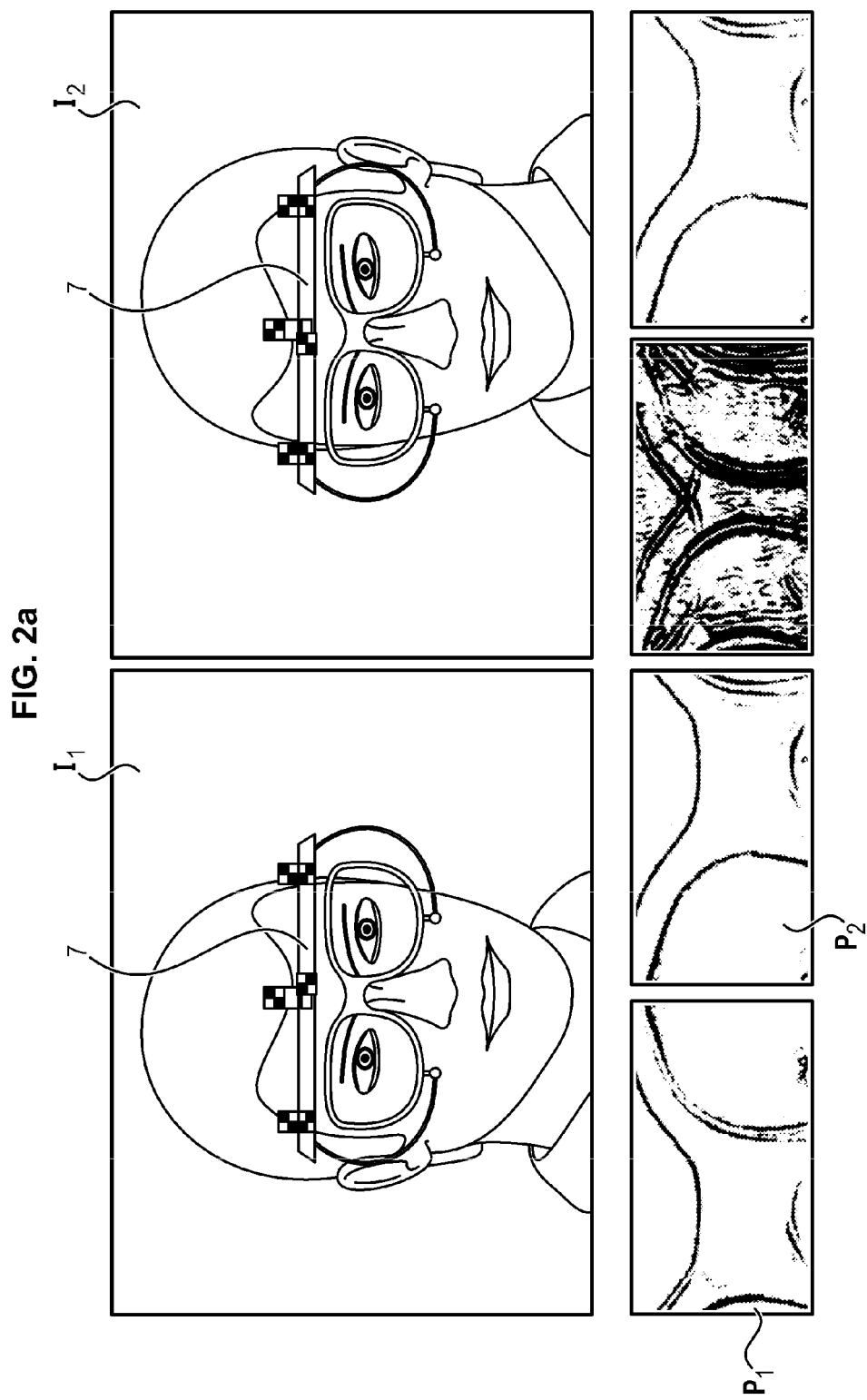

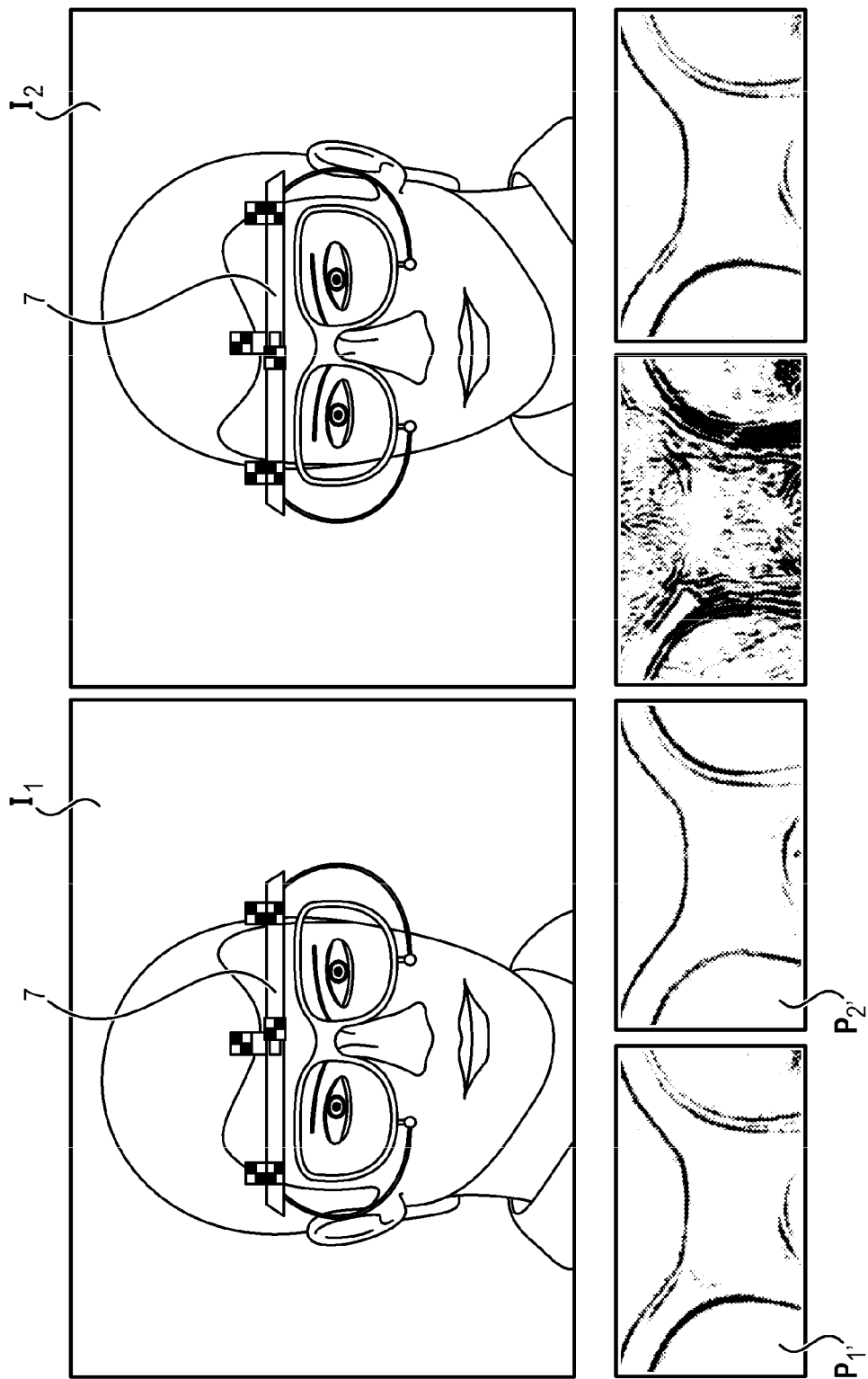

AUTOMATIC ESTABLISHMENT OF PARAMETERS NECESSARY FOR CONSTRUCTING SPECTACLES

CROSS-REFERENCE TO RELATED APPLICATIONS

The present application is a national phase entry under 35 U.S.C § 371 of International Application No. PCT/EP2019/075754 filed Sep. 24, 2019, which claims priority from French Application No. 1858644 filed Sep. 24, 2018, all of which are hereby incorporated herein by reference.

FIELD OF THE INVENTION

The invention relates to the field of the taking of measurements usually carried out by an optician for the purpose of personalizing corrective ophthalmic lenses and assembling them on a frame. More precisely, the invention relates to the field of optical metrology, i.e. the measurements of the different parameters necessary for constructing spectacles.

TECHNICAL BACKGROUND

To construct glasses, and particularly vision-correcting spectacles, it is necessary to cut corrective lenses as a function of various parameters related to the subject wearing the spectacles and the frame of the spectacles.

In a manner known per se, a frame conventionally consists of two circles or half-frames which are intended to each house one edged corrective lens. These two circles are connected to one another by a bridge and each bear a side, attached by way of a lug. Each circle has a recess, usually called the groove, which runs along its internal face.

The parameters of a frame are generally given in the "boxing" system as per the ISO 8624 standard which corresponds to the rectangle encasing (or boxing) the external cut-out of the corrective lenses (and therefore at the bottom of the groove of the frame when the frame is full-rimmed). The term "D dimension" refers to the distance between the two boxing rectangles of a given frame, "A dimension" the width of each boxing rectangle, "B dimension" their height and "wrap" the angle formed between one of the boxing rectangles and the plane comprising the nasal segments (substantially vertical segments and the closest to the nose) of the left and right boxing rectangles of the frame. The value of the camber of the frame, the so-called frame base and the value of the curvature of the glass, the so-called base of the glass, may also be used.

Usually, an optician directly measures the parameters related to the subject and the parameters defining the boxing rectangles on the frame using a ruler.

This method not being very accurate, in document FR 2 719 463 it was proposed to acquire an image of the subject wearing the frame using a video camera than determine, on the image and automatically, the position of the horizontal and vertical lines tangent to the corrective lenses (aligned with the sides of the boxing rectangles) by analysis of the luminance gradient and extraction of the contours of the frame. To do this, this document proposes to define a window within the image and to determine, in this window, the points for which the norm of the luminance gradient is greater than a threshold value to obtain the internal and external contours of the frame. The shape of the frame then the tangent to the internal contour of the frame shall be further determined in this window on the basis of the contours.

However, it transpires that the relevant contours for determining the parameters of the boxing rectangles are not necessarily sharp and/or continuous and/or visible and/or homogenous (particularly due to the reflections on the images, the color of the rims and especially the groove which can have contours that are complex and difficult to visualize on an image). The result is that on the image the desired contours are often partially invisible or weakly demarcated, and many interference contours are often present, being very close and sometimes more pronounced than the desired contours, which make it hard to detect these contours and therefore the determination of the parameters defining the boxing rectangles.

The document US 2015/015848 describes a method of automatic determination of parameters in view comprising the following steps:
  acquisition of a first image of the frame and a second image separate from the first image
  identification of a reference marker in each image,
  modification of at least one of the parameters of the model previously defined,
  in each image, simulating a plurality of values for a given parameter (e.g. eye-to-lens distance) then determine what value of this parameter is the closest to the real parameter and reiterating this step until the iterations give a result.

However, this document does not teach how to position the boxings (which are the frame parameters) on the images.

The document WO 2006/092479 describes a method of automatic determination of a geometrical feature of an anatomical segment (arm, leg etc.) comprising the following steps:
  acquisition of a first image and a second image separate from the first image
  definition of a region of interest in the first image,
  identification in the region of interest of a desired anatomical point and determination on the other images of a number of coordinates of the anatomical point of interest by correlation and deduction of the actual coordinates of the anatomical point.

The purpose of this document is to measure anatomical lengths and not to determine vision parameters of a wearer.

SUMMARY OF THE INVENTION

One aim of the invention is to propose an alternative method making it possible to automatically provide a more repeatable, reliable, independent and more robust measurement of all or part of the necessary parameters with a view to the personalization and manufacturing of a pair of spectacles, such as in particular the parameters defining the boxing rectangles of the corrective lenses of the pair of spectacles, the shape of the rims, the frame base, the glass base, the centering parameters of the corrective lenses in the frame (half pupillary distances and ocular center heights), or of personalization of the corrective lens (vertex distance, position of the center of rotation of the eye with respect to the corrective lens, heading angle, pantoscopic tilt, shape of the glass etc.) which are more robust and more accurate than in the prior art and which does not necessarily require the shape of the lenses to be detected ahead of time.

To do this, the invention makes provision for a method of automatic determination of parameters for the purpose of centering and/or personalizing corrective lenses of spectacles, said spectacles comprising a frame and the method comprising the following steps:

S1: acquisition of a first image of the frame from a first viewing angle,

S2: acquisition of a second image of the frame from a second viewing angle, the first viewing angle being different to the second viewing angle, S3: identification, in the first image and in the second image, of visual markers and deduction of a reference system related to these visual markers, S4: determination of an element of the frame, S5: definition of an initial model of the frame in the reference system on the basis of a set of predefined initial parameters, S6: definition of a region of interest boxing the element of the frame in the initial model, S7: projection, into the first image and into the second image, of the region of interest, S8: comparison of the projections of the region of interest into the first image and into the second image and evaluation of a similarity between said projections, S9: modification of at least one of the parameters of the model defined in step S5, S10: reiteration of steps S6 to S9 until the obtainment of a maximum of similarities between the projections of the region of interest into the first image and in the second image, S11: deduction of the at least one parameters of the model associated with the projections having the maximum of similarities.

Certain preferred but non-limiting features of the method of automatic determination defined above are as follows, taken individually or in combination:

the comparison step S8 is carried out by comparison of the gradients in each of the projections.

the gradients are compared using a Sobel filter so as to obtain two filtered images, then the two filtered images are compared by taking the sum of the squares of the pointwise differences or by computing a correlation by taking the pointwise product.

the element of the frame comprises a bridge and the parameter or parameters of the model modified in step S9 correspond to a translation in the reference system of the model defined in step S5 along an axis substantially normal to a sagittal plane of the head of a subject or along an axis substantially normal to a coronal plane of the head of said subject.

the first image and the second image are acquired during steps S1 and S2 by image acquisition devices, the optical axes of which both form a non-zero angle with a plane of symmetry of the frame, for example an angle of +10° and of −10°, respectively.

when the parameter or parameters of the model modified in step S9 correspond to a translation in the reference system of the model defined in step S5 along the axis normal to the sagittal plane, the method further comprises, prior to the comparison step S8, a step of transformation of the projection of the region of interest into the second image by application of an axial symmetry with respect to the sagittal plane to a plane normal to the second image and passing through its center to said projection of the region of interest into the second image so as to obtain a mirror projection, the comparison step S8 being applied to said mirror projection.

the visual markers comprise targets attached to an accessory joined with the frame and, during the step S9, a single parameter is modified, said parameter corresponds to a translation along one of the axes of the reference system.

the element of the frame comprises a left lug or a right lug and the parameter or parameters of the model modified in step S9 are chosen so as to modify an inclination of the region of interest with respect to a plane tangent to vertical segments of a boxing rectangle of one of the corrective lenses.

the first image is acquired during S1 by an image acquisition device, an optical axis of which is substantially contained in a sagittal plane of a head of the subject and the second image is acquired during step S2 by an image acquisition device, an optical axis of which forms a non-zero angle with the plane of symmetry, for example an angle of 10°.

the image acquisition device acquiring the second image is positioned with respect to the plane of symmetry so as to be closer to the lug determined as an element of the frame in step S4 than to the other lug of the frame.

steps S1 to S11 are first implemented on an element of the frame comprising a bridge of the frame, the parameter or parameters of the model modified in step S9 correspond to a translation in the reference system of the model defined in step S5 along an axis substantially normal to a sagittal plane of the head of a subject or along an axis substantially normal to a coronal plane of the head of said subject, then steps S1 to S11 are implemented on an element of the frame comprising a lug of the frame, the parameter or parameters of the model modified in step S9 are chosen so as to modify an inclination of the region of interest with respect to a plane tangent to vertical segments of a boxing rectangle of one of the corrective lenses.

the method further comprises, following step S11, a step of detection of a contour of the frame in the projections, into the first image and into the second image, of the region of interest, so as to determine the parameters of at least one boxing rectangle of the lenses.

the first image and the second image are acquired using a first image acquisition device and a second image acquisition device, respectively, the first image acquisition device and the second image acquisition device each forming a different angle with a plane of symmetry of the frame, the first image acquisition device being closer to a left lug of the frame whereas the second image acquisition device is closer to a right lug of said frame and the step of detection of a contour comprises a sub-step of detection of a right internal contour of the frame in the projection of the region of interest into the first image and a sub-step of detection of a left internal contour of the frame in the projection of the region of interest into the second image.

the method further comprises, following the detection of the right internal contour and the left internal contour of the frame, a step of deduction of a position, in the reference system, of internal vertical segments of the boxing rectangles of the corrective lenses.

the first image and the second image are acquired using a first image acquisition device and a second image acquisition device, respectively, the first image acquisition device and the second image acquisition device each forming a different angle with a plane of symmetry of the frame, the first image acquisition device being closer to a left lug of the frame whereas the second image acquisition device is closer to a right lug of said frame and the step of detection of a contour comprises a sub-step of detection of a right external contour of the frame in the projection of the region of interest into the first image and a sub-step of detection of a left external contour of the frame in the projection of the region of interest into the second image.

the method further comprises, following the detection of the external and internal contours of the lenses, a step of deduction of a position, in the reference system, of external and internal vertical segments of the boxing rectangles of the corrective lenses.

the method further comprises a step of correction of perspective in the first image and in the second image prior to the comparison step S8.

the method further comprises, prior to step S3, an additional step during which at least a third image of the frame is acquired, the steps S3 to S11 being then implemented on the first, second and third image or images.

the third image or images are acquired from a same point of view as the first image and/or the second image.

the third image or images are acquired from a different point of view than the first image and the second image.

during step S8, the similarity is evaluated by taking a sum of the square of the pairwise differences for any pair of images from among the set of the first, second and third image or images available.

steps S9 to S11 are carried out by changing image pairs at each iteration of step S10, steps S1 to S3 being previously carried out at least once for each image.

the first image is acquired using a first image acquisition device, the second image is acquired using a second image acquisition device, one from among the first and the second image acquisition device being closer to the ground than the other of the image acquisition devices.

According to a second aspect, the invention also proposes a method of determination of a shape of a contour of a lens for a frame, said method comprising the following steps:
automatic determination of parameters defining a boxing rectangle of the frame in accordance with the method as per the first aspect, and
determination of the shape of the lens on the basis of the frame parameters thus determined.

Certain preferred but non-limiting features of the method of determination of a shape of a contour defined above are as follows, taken individually or in combination:
the step of determination of the shape of the lens comprises the following sub-steps: normalization of the shape of the lens on the basis of the parameters defining the boxing rectangle of the lens, and definition of a parametric model of the normalized shape of the lens.
the step of definition of a parametric model is carried out by the use of at least one of the following methods: principal component analysis, determination of a Fournier transform, splines, B-splines, non-uniform rational B-splines.
the method further comprises the following steps:
projection of a region of interest corresponding to all or part of the contour defined by the parametric model in the first image and/or the second image,
evaluation of a similarity between each point of the projection of the region of interest into the first image and/or the second image and a contour in said image,
modification of at least one parameter of the parametric model,
reiteration of the steps of projection and evaluation until the obtainment of the maximum of similarity between the projection of the region of interest into the first image and/or in the second image and the contour, and
deduction of the parameter or parameters of the parametric model corresponding to the contour of the lens.

the step of evaluation of a similarity comprises at least one of the following methods:
establishment of a score for the first image and/or the second image indicating whether each point of the projection of the region of interest in the image corresponds to a contour in said image,
comparison of the gradients.

According to a third aspect, the invention proposes a device for automatic determination of parameters for the purpose of centering and/or personalizing corrective lenses of spectacles, said spectacles comprising a frame, the device comprising means for the implementation of a method of determination as described above comprising:
means of acquisition of a first image of the frame from a first viewing angle,
means of acquisition of a second image of the frame from a second viewing angle, the first viewing angle being different to the second viewing angle,
means of identification, in the first image and in the second image, of visual markers and deduction, for each image, of a reference system related to these visual markers,
means of determination of an element of the frame,
means of definition of an initial model of the frame in the reference system on the basis of a set of predefined initial parameters,
means of definition of a region of interest boxing the element of the frame in the initial model,
means of projection, into the first image and into the second image, of the region of interest,
means of comparison of the projections of the region of interest into the first image and into the second image and evaluation of a similarity between said projections,
means of modification of at least one of the parameters of the model defined in step S5,
means of reiteration of the steps S6 to S9 until the obtainment of a maximum of similarities between the projections of the region of interest (9) into the first image and into the second image,
means of deduction of the at least one of the parameters of the model associated with the projections having the maximum of similarities.

Optionally, at least one out of the first and second image acquisition means is closer to the ground than the other among the first and the second image acquisition means.

According to a fourth aspect, the invention proposes a system of automatic determination of parameters for the purpose of centering and/or personalizing corrective lenses of spectacles, said spectacles comprising a frame, the system comprising a determination device as described above and targets attached to an accessory joined with the frame, the visual markers comprising the targets.

According to a fifth aspect, the invention also proposes a method of automatic determination of a contour of a spectacle lens, said method comprising the following steps:
(i) acquisition of at least one image of the lens,
(ii) determination of a boxing rectangle of the lens in said image, said boxing rectangle comprising at least one dimension corresponding to a width of the boxing rectangle and one dimension corresponding to a height of the boxing rectangle, (iii) definition of a parametric model of the contour of the lens.

(iv) projection in the image of a region of interest corresponding to all or part of the contour defined by the parametric model, (v) evaluation of a similarity between each point of the projection of the region of interest in the image and a contour in said image, (vi) modification of at least one parameter of the parametric model, (vii) reiteration of the steps (iv) of projection and (v) evaluation until the obtainment of a maximum of similarity between the projection of the region of interest and the contour, and (viii) deduction of the parameter or parameters of the parametric model corresponding to the contour of the lens.

Certain preferred but non-limiting features of the method of automatic detection of a contour defined above as follows, taken individually or in combination:

the step of definition of the parametric model is carried out using at least one of the following methods: principal component analysis, determination of a Fourrier transform, splines, B-Spline, non-uniform rational B-splines (NURBS).

the step (v) of evaluation of a similarity comprises at least one of the following methods:

establishment of a score for the first image and/or the second image indicating if each point of the projection of the region of interest in the image corresponds to a contour in said image, comparison of the gradients.

the method further comprises, prior to the step (iii) of definition of a parametric model, a prior step of normalization of the contour of the lens on the basis of the parameters defining the boxing rectangle of the lens.

the step (ii) of determination of a boxing rectangle of the lens is carried out by an operator by positioning the segments of the boxing rectangle on the image.

two images are acquired during the acquisition step (i), and wherein the steps (iv) of projection, (v) of evaluation, (vi) of modification and (vii) of reiteration are implemented for each image.

the step (ii) of determination of a boxing rectangle of the lens is carried out automatically on the basis of at least two images of the lens.

the step (ii) of determination a boxing rectangle comprises the following sub-steps:

S1: acquisition of a first image of the frame from a first viewing angle,

S2: acquisition of second image of the frame from a second viewing angle, the first viewing angle being different to the second viewing angle, S3: identification, in the first image and in the second image, of visual markers and deduction, for each image, of a reference system related to these visual markers, S4: determination of an element of the frame, S5: definition of an initial model of the frame in the reference system on the basis of a set of predefined initial parameters, S6: definition of a new region of interest boxing the element of the frame in the initial model, S7: projection, into the first image and into the second image, of the region of interest, S8: comparison of the projections of the region of interest into the first image and into the second image and evaluation of a similarity between said projections, S9: modification of at least one of the parameters of the model defined in step S5, S10: reiteration of the steps S6 to S9 until the obtainment of a maximum of similarities between the projections of the new region of interest into the first image and into the second image, S11: deduction of the at least one of the parameters of the model associated with the projections having the maximum of similarities.

the method further comprises, following the step S11, a step of detection of a contour of the frame in the projections, into the first image and into the second image, of the new region of interest, so as to determine the dimensions corresponding to the width and the height of the boxing rectangle of the lenses.

the first image and the second image are acquired during the acquisition step (i) using a first image acquisition device, respectively, the first image acquisition device and the second image acquisition device each forming a different angle with a plane of symmetry of the frame, the first image acquisition device being closer to a left lug of the frame whereas the second image acquisition device is closer to a right lug of said frame, the step of detection of a contour comprises a sub-step of detection of an external contour and an internal contour of the lens in the projection of the region of interest into the first image and the method further comprising, following the detection of the external and internal contours of the lens, a step of deduction of a position, in the reference system, of external and internal vertical segments of the boxing rectangle of the lens and of the dimension corresponding to the width of said boxing rectangle.

the step of detection of a contour comprises a sub-step of detection of an upper horizontal contour and a lower horizontal contour in the projection of the region of interest in at least one from among the first and the second image and the method further comprises, following the detection of said horizontal contours, a step of deduction of a position, in the reference system, of horizontal segments of the rectangle boxing the lens and the dimension corresponding to the height of said boxing rectangle.

The invention can be generalized in the following ways with the three or more image acquisitions:

During steps S1 to S8, it is possible to use a third image acquisition or more, having identical or different angles of view to the two first images. The step S3 is carried out on this image/images in the same way as for the two other images and the step S8 uses additional information for the similarity computation resulting from the additional images. For example the pointwise difference of the regions of interest can be replaced by the sum of the square of the pairwise differences for any pair of images from among the set of images available.

Moreover the steps S9 to S11 may be carried out by changing the pair of images (first and second image) at each iteration of the step S10, the steps S1/S2 and S3 being previously carried out at least once for each image.

Optionally, in the case where the measurements are carried out without an accessory disposed on the frame, the device further comprises an additional camera closer to the ground than the other cameras in order to allow the measurement of the pantoscopic tilt of the frame of the subject. This specifically makes it possible to improve the quality of the measurement of this angle.

BRIEF DESCRIPTION OF THE DRAWINGS

Other features, aims and advantages of the present invention will become apparent on reading the following detailed description, and with reference to the appended drawings given by way of non-limiting examples and wherein:

FIG. 2a illustrates an example of a first image and second image of a subject wearing a frame to which is attached an example of an accessory, on which have been represented the limits of the projection of a region of interest, here at the level of the bridge of the frame. The projection in the first image and the mirror projection associated with the second image as well as their comparison are also represented, from right to left, under the first image and the second image.

FIG. 2b illustrates the example of a first image and second image of FIG. 2a after modification of the coordinate along the axis X of the model of the frame in the reference system of the accessory. The corresponding projection in the first image and the mirror projection associated with the second image as well as their comparison are also represented, from right to left, under the first image and the second image.

DETAILED DESCRIPTION OF AN EMBODIMENT

Figure 1:
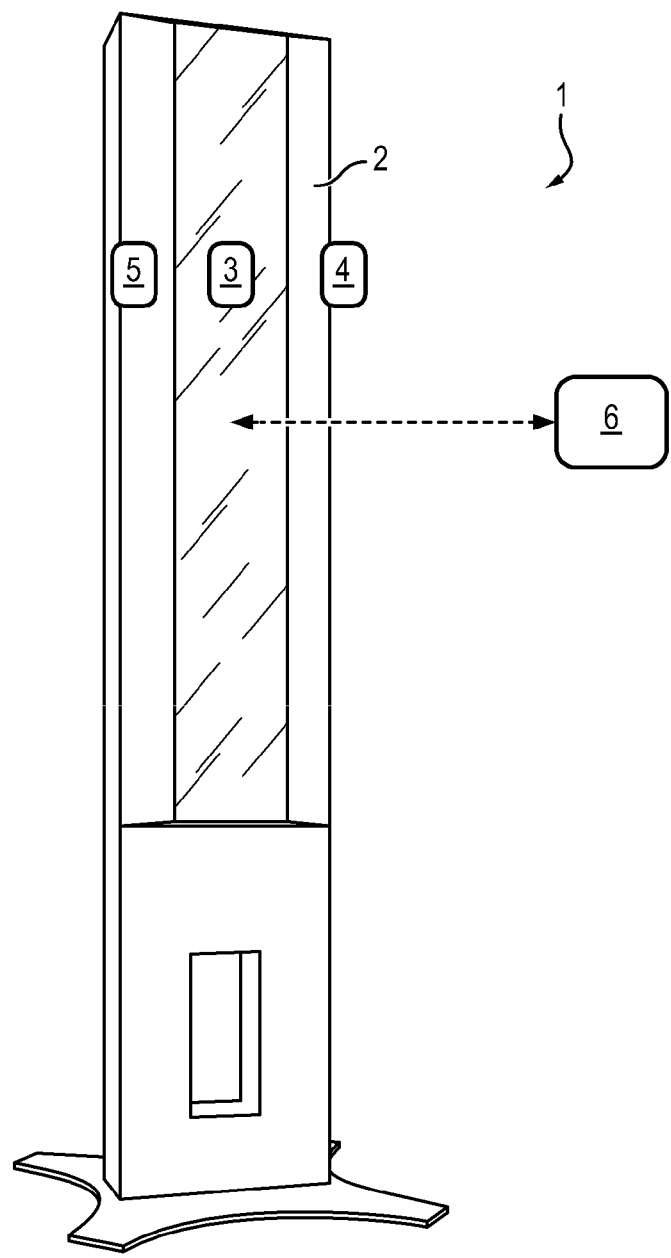
FIG. 1 is a perspective view schematically illustrating an exemplary embodiment of an item of equipment that can be used for the implementation of a method in accordance with the invention.
Figure 3A:
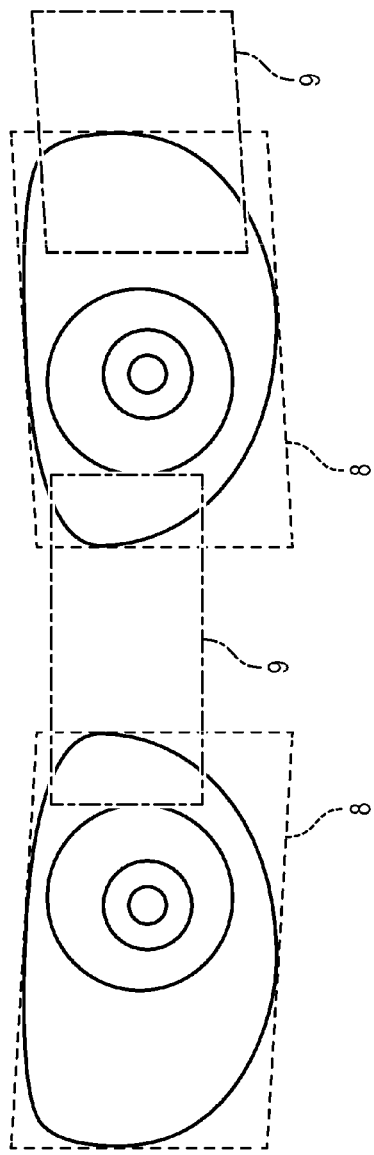
FIG. 3a is an example of a frame model that can be used in a method in accordance with the invention, seen in front view. It should be noted that the eyes of the subject have been schematized in order to simplify this model, although these are not necessary for the implementation of the method.
Figure 3B:
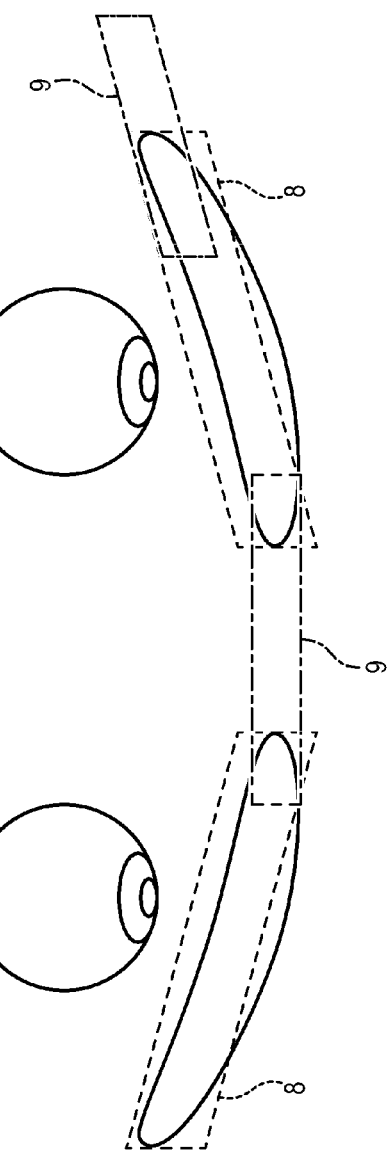
FIG. 3b shows the example of a frame model of FIG. 3a in top view.
Figure 4:
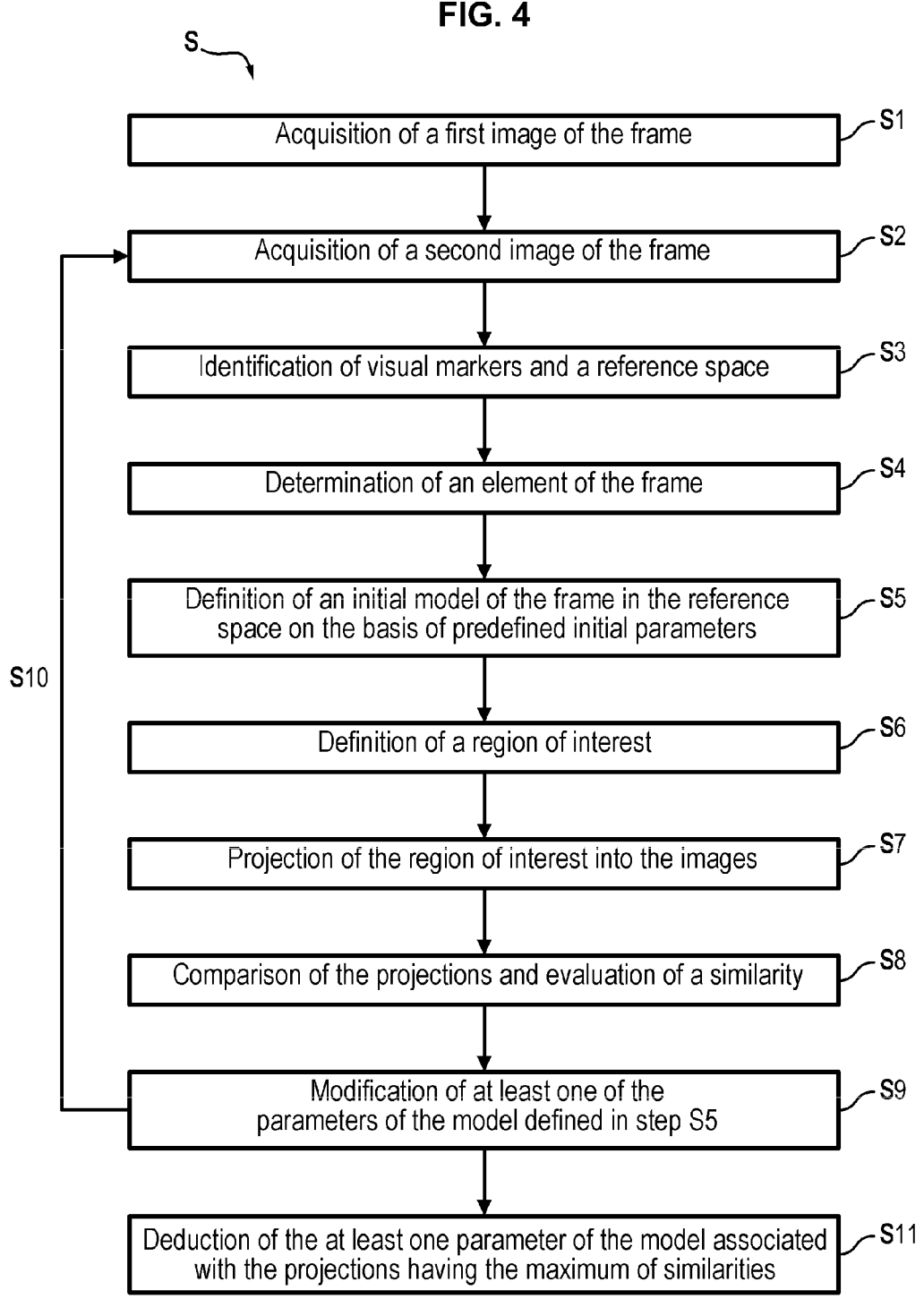
FIG. 4 is a flow chart illustrating examples of steps of a method in accordance with the invention.

In order to determine the centering and/or personalization of corrective spectacle lenses in an automated and repeatable manner, the invention proposes a method of automatic determination during which two images of the frame are acquired from different angles of view and one determines, on the basis of these images, the position of the frame in a reference system defined on the basis of visual markers identifiable on these images, by optimization of a model of the frame.

The parameters allowing the centering and personalization of the corrective lenses that can be determined using the method comprise, without limitation: the parameters defining the dimension of the boxing rectangles 8 of the lenses (A and B dimensions) of their relative position (D dimension and wrap), their position with respect to the direction of the gaze for a reference posture (for example, for the far sight posture, the pantoscopic tilt and the heading angle), the centering parameters that comprise the half pupillary distances and the heights. Parameters that can be used for personalization of the glass are the vertex distance or the position of the center of rotation of the eye with respect to the glass, the pantoscopic tilt, the wrap and the heading. Optionally, parameters describing the shape of the rims of the frame can also be used, for example in conjunction with the centering parameters to minimize the thickness of the glass, particularly for positive correction lenses for a hypermetropic wearer. In this case the description of the shape of the frame must be sufficiently accurate to know the minimum thickness at the edge of the glass that can be had once the glass is cut for assembly in the frame rims.

During the image acquisition, the frame is preferably worn by a subject. In addition, the images are preferably taken simultaneously.

The detection method can be implemented by any appropriate item of equipment 1.

For example, an item of equipment 1 that can be used comprises a column 2 including at least two image acquisition devices 2, 3, 4 configured to acquire the images. The image acquisition devices 2, 3, 4 may in particular comprise a video camera, an infrared camera, a digital camera, a scanner or any other means.

In an embodiment, the item of equipment 1 comprises two image acquisition devices 4, 5 positioned on either side of the column 2 such that their optical axis forms a non-zero angle with a plane of symmetry of the column 2. The subject then being positioned facing the column 2, the two image acquisition devices 4, 5 are therefore located on either side of the frame, during the acquisition of the first and the second image.

For example, the image acquisition devices 4, 5 may form an angle of +10° and −10° with respect to this plane of symmetry.

In an alternative embodiment, the item equipment 1 further comprises a third image acquisition device 3, placed centrally in the column 2—i.e. in the plane of symmetry of the column 2—so as to acquire images of the front of the frame. The third image acquisition device 3 may for example be housed in the column 2 and masked by a one-way mirror in such a way that the subject wearing the spectacles can see himself in a mirror during the image acquisition (for far sight for example), without the camera hindering his behavior and affecting the measurement.

In a manner known per se, the visual markers may comprise singular points of the face and/or targets attached to an accessory 7 joined with the frame.

For example, at the time of the acquisition of the first and the second image, an accessory of clip-on type can be placed on the frame. In the exemplary embodiment illustrated on the figures, the accessory for example comprises a slender horizontal support configured to be placed on the upper rim of the frame, a stem extending vertically from the support and a protruding part extending horizontally, perpendicular to the support and to the stem.

It comprises at least three targets, for example four targets: a target attached at the level of each of the right and left ends of the support, a central target attached to the stem and a forward target attached to the end of the protruding part. Where applicable, the accessory can further comprise two flexible curved stems configured to bear on the lower rim of the frame, the stems being able to be each equipped at the level of their free end with an additional target.

The targets may comprise a colored marker, the color of which has a clearly-defined spectrum (for example bright green) and/or geometrical shapes (for example a black and white or red and green checkerboard). The accessory may further comprise grippers configured to hook the support onto the frame steadily.

Identification of the targets in the images thus makes it possible, when the relative position of the targets on the accessory are known, to define a reference system. This reference system then comprises a first axis X substantially parallel to an upper rim of the frame corresponding to the axis linking the targets positioned at the level of the right and left ends of the support, a second axis Z normal to the axis X and parallel to the protruding part, and a third axis Y normal to the axis X and to the axis Z. The three axes cross at the center of the accessory, at the level of the junction of the stem and the protruding part, which therefore corresponds to the origin of the reference.

Of course, any other reference system can be defined, either on the basis of the identification of targets in the images, or on the basis of other reference points. Thus, as has been seen above, the invention is also applicable in the case where the visual markers comprise singular points of the face, instead and in place of the accessory equipped with visual targets. In this case, the reference system may be defined for example by determining the axis of the gaze of the subject, for example on the basis of the middle of the segment formed by the two centers of rotation of the eyes of the subject and of the target gazed at by the subject. The reference system may then comprise a first axis passing through the center of rotation of the eyes, a second axis being the axis of the gaze as defined passing through the middle of the segment linking the centers of rotation of the eyes and defining the origin of the reference, and a third axis corresponding to gravity and passing through the origin. Where applicable, the reference system can then be made orthonormal. In a second example, the reference system may comprise a first axis passing through the center of rotation of the eyes, a second axis corresponding to gravity and passing through the middle of the segment linking the centers of rotation of the eyes and a third axis normal to the first and to the second axis and passing through the origin.

In the following, and only to simplify the description, the reference system comprises the axes X, Y, Z and the center O described above.

The item of equipment 1 further comprises a processing unit 6 comprising processing means, for example a computer or a server possessing processing means, suitable for executing the method that will be described in more detail hereinafter. The processing means may for example comprise an ECU of processor, microprocessor, microcontroller etc. type. The item of equipment 1 also comprises control means (touch-sensitive screen, keyboard, mouse, buttons etc.).

The automatic detection method then comprises the following sub-steps:

S1: acquisition of a first image of the frame from a first viewing angle.

S2: acquisition of a second image of the frame from a second viewing angle, the first viewing angle being different from the second viewing angle, S3: identification, in the first image and in the second image, of visual markers and deduction, for each image, of a reference system related to these visual markers, the reference system comprising three axes, S4: determination of an element of the frame, S5: definition of an initial model of the frame in the reference system on the basis of a set of predefined initial parameters, S6: definition of a region of interest 9 boxing the element of the frame in the initial model, S7: projection, into the first image and into the second image, of the region of interest 9, S8: comparison of the projections of the region of interest 9 into the first image and into the second image and evaluation of a similarity between said projections, S9: modification of at least one of the parameters of the model defined in step S5, S10: reiteration of steps S6 to S9 until a maximum of similarity is obtained between the projections of the region of interest 9 in the first image and in the second image, S11: deduction of the at least one of the parameters of the model associated with the projections having the maximum of similarities.

The term "projection" is here understood to mean the matching of points of the region of interest to points of the image.

In a first embodiment, the initial model comprises the two boxing rectangles and their position in the reference system, the initial parameters of which are set as a function of their predefined average values. More precisely, each boxing rectangle comprises two vertical segments, corresponding to the nasal segment and the temporal segment of one of the rims of the frame, and two horizontal segments, respectively corresponding to the upper rim and the lower rim of the frame. The definition of the initial parameters may comprise the A, B and D dimensions, the wrap and/or position of the frame in the reference system. These parameters are equivalent to positioning the nasal segments, upper and lower, in the reference system. The frame base and/or the glass base may be estimated or measured to improve the model of the frame. Specifically, the frame being curved, the rims of the frame are not on a plane. The result is that the horizontal segments are not on the same plane as the vertical segments. Not taking into account of this offset can induce errors when the acquisition of the cameras does not correspond to the agreed projection on the planes of the boxing rectangles. Taking into account the frame base and/or the glass base therefore makes it possible to better position the segments of the boxing rectangle.

It should be noted that, according to the application, it is possible that the definition of lines rather than segments (nasal, temporal, upper or lower lines) suffices. For example, to obtain the centering parameters (half pupillary distances and ocular center heights) along the horizontal lower line and the middle one of the temporal segments (in other words substantially the position of the frame on the axis X of the reference system) may suffice.

Alternatively, the initial model may be defined on the basis of the dimensions (A B and D) of the frame, when the latter are known and supplied, for example by the manufacturer.

Then, during a first step, a first parameter of the frame model can be determined on the basis of the first and second images acquired by the image acquisition devices 3, 4, 5 during the steps S1 and S2.

In an embodiment, the first image and the second image are acquired by the first and second image acquisition devices 3, 4, 5 which are located on either side of the column 2, by forming a non-zero angle with its plane of symmetry. Such a configuration of the image acquisition devices 3, 4, 5 specifically makes it possible to reduce the differences in perspective observed between the images acquired by the two devices. For example, the optical axis of the two image acquisition devices 3, 4, 5 can form an angle of 10° with the plane of symmetry of the column 2.

Alternatively, the first image may be acquired using the third image acquisition device 3, which is contained in the plane of symmetry of the column 2, whereas the second image is acquired using one of the two other image acquisition devices 4, 5.

During step S7, the region of interest 9 is projected into the first image and into the second image.

With the subject wearing, on the frame, an accessory equipped with the targets, the first and the second image replicate these targets. When the distance and the respective position of each target on the clip are known, it is therefore possible to determine in each of the images the position and orientation of the accessory and to deduce from this the position and orientation of the reference system. The coordinates of the region of interest 9 being determined in the reference system owing to the initial model, it is therefore possible to project it into the plane of the first and the second image.

Optionally, a so-called step of correction of the perspective of the projections into the first and the second image may be implemented in order to facilitate the search for maximum similarity during the step S8 between said projections. In particular, since the extrinsic and intrinsic parameters of the cameras are known, the position on each image of each point of the region of interest 9 is also known. It is therefore possible to transform the projection of each point on the first and the second image in such a way that the relative distances of the region of interest 9 are conserved between each projection. For convenience, such a transformation will be referred to as a perspective correction. Such a transformation makes it possible to make comparisons during the step S8 by taking into account the vicinity of each point of the area of interest (for example computations of gradient, extractions of contours or of maps of distance to the nearest contour) by dispensing with the deformations related to the point of view of the camera. Should the region of interest 9 be a rectangle, one possible transformation for making this perspective correction is to once more project the projections onto the first and the second image onto a rectangle of the same dimensions as the region of interest 9. If the images obtained by the cameras do not have any substantial distortions (or if these have been corrected), then it is a case of a simple affine transformation transforming the trapezoid perceived on each image representing the region of interest 9 into a rectangle with the proportions of the region of interest 9. The two reprojections to be compared are then two rectangular images with the dimensions of the region of interest 9. Any point of the region of interest 9 scattering light visible by the cameras will have the same luminous intensity and will be at the same position on these two rectangular images as on the region of interest 9. As a result, if the surface of the frame scatters the light and is indeed present on the region of interest 9, the two rectangular images thus corrected will have a very small difference and therefore a maximum of similarity during step S8.

Optionally, it is possible during the projection of the region of interest 9 onto each image, to note for each point of the region of interest 9 the luminosity information about the point projected onto each image. The comparison of the step S8 therefore equates to comparing the information noted directly in the 3D space of the region of interest 9. This approach is more general and is applicable to regions of interests of a variety of shapes but may require more computations than the projections described above.

Optionally, prior to the similarity computation, the images of gradients may be transformed into a distance map (conventional so-called distance transform operation), in such a way as to facilitate the optimization of the model parameters. Specifically, owing to the distance map the similarity criterion will gradually increase when the frame parameter improves, which makes it possible to know how to modify this parameter.

During step S8, the projections of the region of interest 9 into the first image and into the second image are then compared so as to evaluate their similarity.

The comparison step S8 may in particular be carried out by comparison of the gradients in each of the projections. To do this, in an exemplary embodiment for finding the position of the frame on the X axis or the Z axis of the reference system or the wrap of the frame, the vertical gradients are computed using a Sobel filter, then the two images resulting from these filters may be compared for example by taking the sum of the squares of the pointwise differences, or else by computing the correlation by taking the pointwise product. Other methods for evaluating the similarity of the images may be used such as computations of contour detections and distance maps on each image.

When the similarity of the projections has been estimated during the step S8, at least one of the parameters of the model defined in step S5 is modified, then the steps S6 to S9 are reiterated until the projections of the region of interest 9 into the first and into the second image have a maximum of similarity.

It will be noted that, when the similarity of the projections is low, this means that the element of the frame selected in step S4 is not found in the position that has been supposed in the model, since the viewing angle is different. This is why at least one of the parameters of the model is modified, until the projections are similar.

However, when the similarity of the projections is maximal, this implies that the element of the frame is indeed located in the position supposed by the model. The parameter or parameters of the model that have been chosen to carry out these projections then match the actual parameters of the frame.

During additional steps, all or part of the other parameters of the model may then be optimized, by reiterating the steps S5 to S6 and by successively modifying the different parameters, until all the parameters necessary for the operator are optimized. For example, when the operator seeks only to determine the pupillary distance (or half pupillary distance) and the centering heights, the operator only needs to determine (i) the position of the frame along an axis normal to a sagittal plane of the head of the subject and (ii) the position of the lower line of the boxing rectangle. It is therefore not necessary to optimize the other parameters of the model.

The term "sagittal plane of the head of the subject" is understood to mean the conceptual plane separating the left half from the right half of the head of the subject. In addition, the term "coronal plane" is understood to mean the conceptual plane perpendicular to the sagittal plane and which separates the face of the subject into an anterior part and a posterior part.

In the following, the invention will more specifically be described for the case where the frame element comprises the bridge of the frame (i.e. the nasal part of the frame linking its two rims). This is however not limiting, the frame element being able to comprise any other part of the frame, including in particular a lug, a nasal segment, an upper rim etc.

The initial model is first positioned in the reference system symmetrically with respect to the origin of the reference system and aligning the upper elements of the boxing rectangles parallel to the axis X.

The region of interest 9 is a three-dimensional surface defined on the basis of the model such that its projection into the first and into the second image boxes the bridge of the frame. In practice, in order to guarantee that each projection does indeed box the bridge of the frame, despite the fact that the initial parameters are not yet adjusted to the actual parameters of the frame, the region of interest 9 is defined so as to be greater than the D measurement predefined in the model, while remaining small enough not to box too many foreign elements (corner of the eye, lashes etc.) in the images.

For example, the region of interest 9 may be a surface of overall rectangular shape and be placed symmetrically with respect to the axis Y of the reference system. By assumption, as the accessory must be placed by the operator on the frame in a way that is centered with respect to the frame, and therefore with respect to the bridge, the projections of the region of interest 9 into the first image and into the second image should also be centered with respect to the frame if the parameters of the model matched the actual parameters of the frame. This assumption thus makes it possible to limit the size of the region of interest 9.

It will be noted that, the accessory being by definition supported by the upper rim of the frame and, if possible, by its lower rim (owing to the curved stems which are optional), it is possible to easily determine certain parameters directly on the basis of the determination of the position of the accessory in the space. These parameters comprise:

the pantoscopic tilt, which corresponds to the measurement of the inclination of the median plane of the corrective lens about the axis X, with respect to the vertical. It is a tilted angle which reflects the fact that the subject tends to have the face more or less raised or lowered when he is looking at an object placed right in front of him.

the heading angle, which corresponds to the measurement of the angle of rotation about the axis Y of the plane formed by the two nasal segments. A heading of zero degrees may be defined for example when the axis of the gaze is orthogonal to this plane. The heading is a tilted angle which reflects the fact that the subject tends to have his face more or less turned to the left or right when he looks at an object placed right in front of him. It is possible to consider that the heading angle of the frame is identical to that of the accessory. Where applicable, the value of the heading angle may be adjusted after determining the position of the frame along the axis X and the value of the wrap of the frame.

the attitude, which corresponds to the measurement of the inclination of the median plane of the corrective lens about the axis Z. Just as for the heading angle, it is possible to consider that the attitude of the frame is identical to that of the accessory. Where applicable, the value of the attitude may be adjusted after determining the position of the vertical segments of the boxing rectangles, by optimizing the right-left correspondence.

the position of the frame along the axis Y. This position is specifically restricted by the bearing points of the accessory on the frame. All that is left to do is to adjust this parameter as a function of the frame thickness to determine the precise position of the upper horizontal segments of the boxing rectangles.

The remaining variables to be determined are thus the position along the axis X and Z of the bridge (and especially its center) in the reference system. Then, when this position is known, it will then be possible to determine all or part of the parameters defining the boxing rectangle of the frame.

To do this, the Applicant has noticed the fact that it was preferable to determine the remaining parameters one after the other by setting the other parameters and by making use of the symmetry of the frame.

Moreover, the order in which the parameters are determined makes it possible to simplify the algorithm of determination of the different parameters of the frame and subject. Preferably, when the reference system is defined on the basis of visual markers carried by an accessory, the algorithm is simplified when the coordinates along the axes X and Z are first established. The determination of the wrap, the nasal and temporal segments or else coordinates along the Y axis may then be determined more easily.

However, as seen above, any other reference system can be used. In this case, the parameters are preferably modified so as to determine the coordinates, in this reference system, of the center of the bridge along the axis normal to a sagittal plane and along the axis normal to a coronal plane, then, once these parameters are set in the model, the other parameters can be determined. To do this, the parameter or parameters of the model modified in step S9 correspond to a translation in the reference system of the model defined in step S5 along an axis substantially normal to a sagittal plane of the head of the subject or along an axis substantially normal to a coronal plane of the head of said subject.

Thus, in the case of the reference system described above (defined by the axes X, Y, Z and the origin O on the basis of the position of the accessory targets), the at least one parameter that can be optimized at first during the step S5 corresponds to the coordinate along the axis X or the axis Z, in the reference system, of the frame model. This modification has the consequence of modifying the position, along this axis, of the region of interest 9, since the latter is defined as a function of the model parameters.

Optionally, in order to facilitate the comparison step S8, prior to this step, one of the projections of the region of interest 9, for example the projection into the second image, is transformed by application of an axial symmetry with respect to a plane normal to the axis X and passing through the center of the image so as to obtain a mirror projection. It is then this mirror projection that is compared with the projection of the region of interest 9 into the first image. This transformation specifically makes it possible to increase the similarities between the projections, by taking into account the symmetry of the frame and the symmetrical viewing angle of the image acquisition devices 3, 4, 5.

For example, FIG. 2a represents the projection of an example of a region of interest 9 into a first image I1 and the mirror projection corresponding to the transformation of the projection of said region of interest 9 into a second image I2. Here, the images I1, I2 were acquired with devices 4, 5 placed symmetrically with respect to the plane of symmetry of the column 2 such that their optical axis forms an angle of +10° or −10° with respect to this plane. The coordinates of the center of the region of interest 9 defined on the basis of the initial model in the reference system are equal to (−6.013; −0.557; 5.878) mm. As can be seen in FIG. 2a, these two projections P1, P2 are out of alignment. This can also be seen from their comparison, which has been carried out here using a Sobel filter then by taking the normalized sum of the squares of the pointwise differences, and which gives a difference equal to 0.655. However, when this method of comparison is applied, the closer the difference to 1, the less the images are similar.

FIG. 2b also represents the projection P1' of this same region of interest 9 into the first image I1 and its mirror projection P2' associated with the second image I2, after offsetting the model 6.431 mm along the axis X, such that the coordinates of the center of the region of interest 9 along the axes X, Y and Z are now equal to (0.418; −0.557; 5.878) mm. As can be seen from their comparison, which gives a difference of 0.175, these two projections P1', P2' are very similar. It is deduced from this that this parameter (coordinate along the axis X of the center of the region of interest 9, which corresponds to the center of the bridge of the frame) is very close to the actual coordinate of the center of the bridge in the first image I1 and in the second image I2. The coordinate along the axis X of the center of the bridge is therefore substantially equal to 0.418 mm.

Steps S5 to S9 can then be reiterated so as to determine the coordinate along the axis Z of the center of the bridge, this time by modifying the coordinate along this axis of the frame model, until the obtainment of the projections of the region of interest 9 with maximal similarities.

It will however be understood that, in the case of the optimization of the coordinate along the axis Z, it is the untransformed projections of the region of interest 9 which are compared, the frame not being symmetrical with respect to a plane that is normal to the axis Z.

The D dimension of the model can also be optimized. To do this, the position of the nasal segments (or nasal lines) of the boxing rectangles of the model is optimized using for the evaluation of the similarity of step S8, the detection of the vertical contours of the frame at the level of its bridge in the first in the second image.

Note that, to accurately identify the position of the vertical contours of the frame, it is preferable that the projections of the region of interest 9 into the first and into the second image be very similar. This is why the parameter of the D dimension is preferably optimized in the model after the determination of the X and Z coordinates of the center of the frame bridge. On the other hand, since the wrap is not necessary for the obtainment of this parameter, it can be determined before or after the D dimension (or alternatively, not be determined if the operator does not need it). It should however be noted that since the D dimension gives the position of the lines containing the nasal segments of the boxing rectangles of the lenses, these lines may be advantageously used as an axis of rotation to subsequently determine the wrap.

In order to determine the D dimension, it is necessary to optimize the position of the nasal lines of the boxing rectangles of the lenses. To do this, the method comprises a step of detection of the internal vertical contour of the frame in the projections, into the first image and into the second image, of the region of interest 9 corresponding to the bridge, starting from the model for which the coordinates along the axis X and the axis Z have been previously optimized.

In an embodiment, in order to simplify the detection of the contours of the vertical rims of the frame, the symmetry of the frame can advantageously be used by detecting the right internal rim of the frame in the image, from among the first and the second image, which has been acquired by the closest device to the left lug of the frame, and by detecting the left internal rim of the frame in the image, among the first and the second image, which has been acquired by the closest device to the right lug of the frame. For example, when the first image and the second image have been acquired by the image acquisition devices 3, 4, 5 forming a non-zero angle with the plane of symmetry, the right internal rim of the frame can be detected in the first image, which has been acquired by the image acquisition device 5 on the left of the column 2, and the left internal rim of the frame can be detected in the second image, which was taken by the image acquisition device 4 on the right of the column 2.

Specifically, the right internal rim is clearer in the image acquired from the left side, since neither the groove, nor the nasal support are visible, whereas in this image, the left internal rim is more difficult to discern due to the presence of various foreign elements. For the same reasons, the left internal rim is clearer on the image acquired from the right side. Moreover, since the coordinates along the axes X and Z of the model have been optimized, the projections of the region of interest 9 corresponding to the bridge in the model are very similar, which makes it possible to search for one of the nasal segments by determination of vertical contours in the first image and the other of the nasal segments by detection of vertical contours in the second image.

Since the contour detection techniques are conventional, they will not be further described here. It is for example possible to use a Canny filter and select the substantially vertical contour elements.

As the position of the frame along the axis X is already known, only one nasal segment can be detected, the other nasal segment being able to be used as confirmation, or else use the side on which the contours are the most pronounced to position the segment.

Once the right or left internal vertical contour of the frame are detected, it is then possible to deduce from this the position, in the reference system, of the nasal segments (or, where applicable, the nasal lines) internally delimiting the two boxing rectangles of the lenses and to deduce from this the shortest distance between these two segments. This distance then corresponds to the D dimension.

In the same way as for the parameter determining the position of the frame along the axis Z previously determined before the wrap, the steps S5 to S9 may then be reiterated so as to determine the wrap of the frame, this time by modifying in the model the angle between the boxing rectangles and the plane tangent to the nasal segments of the boxing rectangles of the frame model, i.e. the segments of the boxing rectangles located close to the bridge.

Just as for the optimization of the coordinate along the axis Z of the center of the frame, it is the projections not transformed by axial symmetry (mirror effect) of the region of interest 9 which are compared for the determination of the wrap.

In order to optimize the wrap measurement, the steps S1 to S11 may be applied using one of the lugs (right or left) as element of the frame, instead and in place of the bridge. This is because the measurement of the wrap angle is more accurate in this part of the frame than at the level of the bridge.

In addition, the wrap can be optimized on the basis of images that can be different to those used for the optimization of the coordinates along the axes X and Z of the center of the bridge, in order to reduce the differences in perspective between the images. To do this, one of the images (side image) can be acquired using one of the image acquisition devices 4, 5, the optical axis of which forms an angle with the plane of symmetry of the column 2 whereas the other image (front image) is acquired by an image acquisition device placed such that its optical axis is contained in this plane. As a result the side image can be chosen from among the first or the second image while the front image can be acquired by the third image acquisition device 3 described above. Preferably, the two images are acquired simultaneously.

In addition, still to optimize the determination of the wrap, the choice of the side image from among the first and second image is determined according to the lug used as the frame element in the wrap determination algorithm. For example, when the frame element is the left lug, the image acquisition device 5 used to acquire the side image is the one closest to this left lug, i.e. the one located to the left of the plane of symmetry. Specifically, on the image acquired by this device, the left rim of the frame is easier to detect as it is clearer insofar as the left limit of the face of the subject (or else his hair or the environment behind the subject) is not visible on this image and the groove is barely or not at all visible. However, these elements make the detection of the contour ambiguous. Conversely, if the element of the frame that is chosen for the implementation of the algorithm is the right lug, the image acquisition device 4 used to acquire the side image is the one closest to this right lug.

Optionally, a step of correction of the perspective in the third and fourth image can be implemented. This step is particularly advantageous for the wrap parameter when the wrap is considerable as in this case the plane of the boxing rectangle is sharply inclined with respect to the image plane and the perspective effects are therefore very pronounced there.

Steps S1 to S11 of the method can then be implemented for the purpose of optimizing the wrap of the frame model in accordance with the following sub-steps:

S1: acquisition of the side image,

S2: acquisition of the front image, preferably simultaneously with step S1,

S3: identification, in the side image and in the front image of the visual markers and deduction, for each image, of the reference system related to these visual markers.

S4: determination of the frame element, for example the left lug when the side image has been acquired by the image acquisition device 5 located on the left of the plane of symmetry, S5: definition of the frame model in the reference system on the basis of a set of predefined initial parameters, the coordinates along the axes X and Z corresponding to the coordinates previously obtained during previous iterations of the method.

S6: determination of the coordinates of a region of interest 9 in the reference system, said region of interest 9 boxing the frame element in the model defined in step S5, S7: projection, into the side image and into the front image, of the region of interest 9, S8: comparison of the projections of the region of interest 9 into the side image and into the front image and evaluation of a similarity between said projections, S9: modification of the angle between the boxing rectangles and the tangent plane in the model defined in step S5, S10: reiteration of the steps S6 to S9 until the obtainment of a maximum of similarities between the projections of the region of interest 9 into the side image into the front image, S11: deduction of the wrap of the frame, said wrap corresponding to the angle between the boxing rectangles and the tangent plane in the model corresponding to the region of interest 9 the projections of which have the maximum of similarity.

The A dimension of the model can also be optimized. To do this, the position of the temporal segments of the boxing rectangles of the model is optimized by detection of the vertical contours of the frame at the level of its lugs.

In a similar manner to that which has been described for the optimization of the nasal segments, it is preferable that the projections of the region of interest 9 in the images be very similar. This is why the parameter of the A dimension is preferably optimized in the model after the determination of the X and Z coordinates of the center of the bridge of the frame. On the other hand, since the A dimension and the wrap are not necessary for the obtainment of certain centering or personalization parameters, they may not be determined if the operator does not need them.

In order to determine the A dimension, it is necessary to optimize the position in the model of the temporal segments of the boxing rectangles of the lenses. To do this, the method comprises a step of detecting the external vertical contour of the lens in the projections, in two images acquired with a different viewing angle, of the region of interest 9 corresponding to the right lug then to the left lug starting from the model for which the coordinates along the X axis and the Z axis (and, where applicable, the wrap) have been previously optimized.

Just like for the wrap, the detection of the contours of the frame at the level of the lugs can be optimized on the basis of images which can be different to those used for the optimization of the coordinates along the axes X and Z of the center of the bridge, in order to reduce the differences in perspective between the images. To do this, the detection of the contours can be done in the projection of the region of interest 9 into the front image and into the side image (which can correspond to the first image or to the second image).

In addition, still to optimize the detection of the contours, the choice of the side image from among the first and second image is determined according to the lug (right or left) boxed in the region of interest 9. For example, when the region of interest 9 boxes the left lug, it is the image acquired by the image acquisition device 5 which is the closest to this left lug, i.e. that which is located to the left of the plane of symmetry. which is used. Conversely, when the region of interest 9 boxes the right lug, it is the other image that it used.

Alternatively, the detection of the contours can of course be done using the first image and the second image, which are both side images. The detection is simply more complex due to the greater difference in perspective between the two images.

The method then comprises a step of detection of the external vertical contour (at the level of the lugs) of the lens in the projections in two images of the region of interest 9 corresponding to the right lug then to the left lug (or conversely), said images being acquired with a different viewing angle.

Once the right and left external vertical contours are detected in the images, it is then possible to optimize the position, in the reference system, of the temporal segments (or, where applicable, the temporal lines) externally delimiting the two boxing rectangles of the lenses. The A dimension then corresponds to the distance between the nasal segment and the temporal segment of a boxing rectangle.

The B dimension of the model can also be optimized.

To do this, during a preliminary step, the coordinate along the axis Y in the reference system of the frame model can be optimized.

This optimization can be done according to one of the contour detection methods described above. The thickness of the frame can also be taken into account in order to better locate the desired contour.

Once the coordinate of the model along the axis Y is optimized, the B dimension of the model can be optimized by detection of the upper and lower horizontal contour of the frame, at the level of one of the corrective lenses of the frame, for example the right lens. This detection of the horizontal and vertical contours can be carried out in one of the images (for example the first image, the second image or else the front image). Once these horizontal contours are detected, it is then possible to optimize the position, in the reference system, of the upper segment and the lower segment of the boxing rectangle of the corrective lens (in this example, the right lens) on which the contours have been detected, and deduce from this the shortest distance between these two segments. The B dimension then corresponds to this distance.

Where applicable, the symmetry of the frame can be made use of in order to confirm the measurement of the B dimension, by reiterating the detection of the contours on the upper and lower horizontal contours of the other corrective lens (in this example, the left lens). If the distance between the upper segment and the lower segment obtained during the detection carried out at the level of the left lens is different to that obtained for the right lens, this means that at least one of the parameters of the model is not optimal and must be modified. This parameter is then optimized again, following the steps described above.

The set of the parameters (A, B, D dimensions, wrap and position of the frame in the reference system) of the frame model determining the boxing rectangles are now optimized.

On the basis of these parameters, it is then possible to determine the shape of the corrective lenses and to accurately position their contour in the reference system. Specifically, since the boxing rectangles by definition frame the corrective lenses, they limit the height and width of the corrective lenses as well as their position. This means that it is possible to simplify the determination of the shape of the corrective lenses by normalizing the shape of the lenses on the basis of the A and B dimensions determined for the boxing rectangles of the lenses, and by defining a parametric model of the normalized shape of each lens.

More precisely, since the segments of the boxing rectangles of the lenses have already been positioned, the contour of the rims is indeed located and it is known that each segment touches at least one point of the contour of each rim. Determining the contours of the spectacle rims therefore equates to extending the frame model used until now to determine the boxing rectangles of the lenses to shape parameters making it possible to describe the shape of the rims of the frame.

Thus, during a first step, a parametric model of each lens is defined in order to describe the shape of the normalized contours using at least one parameter.

For example, in an embodiment, the parametric model can for example be defined by carrying out a PCA (Principal Component Analysis).

To do this, a base is previously defined comprising a plurality of contours of frame rims that is large and complete enough to represent the diversity of shapes that are likely to be detected. The contours of the rims are each described by a set of points in a given reference system, for example a Cartesian reference system related to the boxing rectangle comprising a horizontal axis X', parallel to the top and bottom segments, and a vertical axis Y', parallel to the frontal and temporal segments. Optionally, to improve accuracy, the reference system can further comprise an axis Z' to take into account the frame base or generally take into account the fact that the contour of the rim does not fit exactly into one plane.

Then one applies, to each rim contour of the base, the coefficients x1 and y1 with coordinates along the axes X' and Y', respectively, in such a way as to confer one and the same A and B dimension on all the contours and thus obtain so-called "normalized" contours. For example, the normalized contours can be obtained by dividing the coordinates along the axis X' and the axis Y' of the points of each rim contour of the base by the A dimension and the B dimension of the frame. The normalized contours thus obtained then fit inside a square of dimension 1 along the side. Note that the original shape of the normalized contour can then be retrieved by the inverse operation using the A and B dimensions of the frame.

The parametric model of the normalized frame of each lens can then be defined (third step), for example by applying a PCA to the set of the points of the normalized contours. This results in a list of principal components making it possible to substantially describe any shape of normalized contour. These components constitute a multi-dimensional space that describes the shapes of contours and the origin of which is an "average shape" of the contour base, i.e. a shape that is the closest to all the shapes of the base while minimizing the distance between each point of a normalized contour of the base and the contour of the average shape. By adjusting the first component of the PCA, the average shape will globally modify to approach the greatest number of rim shapes, out of the commonest. By adding additional components, the average shape can be adjusted in detail allowing variants of rarer shapes.

The greater the number of components used, the more details the described shape will be able to have, specific to a given frame or a rarer one.

Note that with a few principal components (for example the five first components), it is already possible to describe most of the shapes of frame rims commercially available with good accuracy.

The advantage of using a PCA is that the components are established by order of relevance to come as close as possible to the actual shape of the contour with a minimum of component values. The number of components to be optimized may be dynamically adjusted as a function of the accuracy and speed of execution that one wishes to obtain.

A first shape parameter to be optimized according to the invention can be a vector comprising a small number of components of the PCA, for example the three first components. Once this parameter is optimized it is possible to keep the shape obtained as a starting point for a new optimization and to take a second parameter comprising more components to refine the shape of the rims if the accuracy obtained with the first parameter is not satisfactory.

Alternatively, this first step of definition of the parametric model can be carried out by determining a Fournier transform, the parameters of which are used to define any shape of contour, splines, B-Spline or more generally NURBS (Non-Uniform Rational Basis Splines), or any method of numerical interpolation making it possible to define a contour on the basis of a limited number of points or values.

Then, in order to determine the shape of the rims, the method comprises a second step during which one projects into the first and/or second image a region of interest 9 corresponding to all or part of the contour defined by the parametric model. For example, in the case where the shape of the internal edge of the rims is optimized, the region of interest 9 can be the vicinity of this internal edge.

The projection of the region of interest 9 into the first and/or the second image can be easily carried out insofar as the shape and position in each image of the boxing rectangles of the lenses have been previously determined and the contour of the lens is of necessity adjacent to the segments of the boxing rectangles (once this model has been scaled to the scale of the boxing rectangles by carrying out an operation to invert the normalization).

During a third step, a similarity is then determined between each point of the projection of the region of interest 9 into the first and/or into the second image and the contour of the frame in the first image and/or in the second image. For example this similarity can be evaluated by establishment of a score for each image indicating whether each point of the projection of the region of interest 9 into the image corresponds to a contour in said image. The closer the point of projection of the region of interest 9 to a contour marked on the image, the higher the score. This score can be maximized for each available image.

As a function of the score thus established, one of the shape parameters of the parametric model can then be modified during a fourth step, then the steps of projection of the region of interest 9 of the parametric model and determination of the similarity can be reiterated until a maximum score is obtained.

When the obtained score is at a maximum, this entails that the projection of the region of interest 9 into the images is very close to the corresponding actual contour of the frame. The parameter or parameters of the parametric model that have been chosen to carry out these projections then match the actual parameters of the contour of the lenses.

The fourth step of determination of the similarity can, alternatively, rely on gradient computations, contour detections and distance maps on each image, as for the boxing rectangle parameters.

It will of course be understood that the detection of the shape of the corrective lenses and the positioning of their contour can be carried out on the basis of boxing rectangles determined according to a different method to the automatic detection method described above. Typically, the boxing rectangles can be previously determined in a conventional manner, for example by manually placing the nasal, temporal and horizontal segments on an image acquired by an operator using a camera (two-dimensional determination of the boxing rectangles), or on two images (three-dimensional determination of the boxing rectangles) and deduce from this the position of the boxing rectangles as well as the A and B dimensions. Starting from this data, it then suffices to use the shape parameter or parameters as described above and to maximize the similarity to deduce from this the contour of the corrective lenses.

Moreover, starting from the measurements and wrap of the boxing rectangles thus determined, it is also possible for the operator to carry out, in an automated manner, the centering of the frame.

To do this, the half pupillary distances can be determined in an automated manner using the optimized model of the frame as follows:
identification of the center of each pupil of the subject on an image, for example one out of the first image, the second image or the front image (acquired behind a one-way mirror), when the subject is in far sight.
determination of the position of the centers of the pupils in the reference system.
deduction of the position of the pupillary enters in the frame reference system (boxing system).

Note that the determination of the position of the centers of the pupils in the reference system can easily be carried out as long as the parameters of the model have been optimized. In particular, in the reference system related to the accessory, the coordinates along the axes X, Y and Z have been optimized, so that it is easy to position the centers of the pupils in the reference system.

The right (or left) height, meanwhile, which corresponds to the distance between the lower segment of the right (or left) boxing rectangle and the center of the right (or left) pupil respectively, can be easily determined on the basis of the optimized model of the frame, on the basis of the position in the reference system of the centers of the pupils and the lower segments of the boxing rectangles.

Moreover, starting from the dimensions and wrap of the boxing rectangles thus determined, it is also possible for the operator to personalize in an automated manner the corrective lenses of the spectacles corresponding to the frame associated with the model.

To do this, the heading angle, the pantoscopic tilt and the vertex distance can be determined in an automated manner using the optimized model of the frame.

If the reference system is obtained by detection of targets on an accessory worn by the subject, the heading and pantoscopic tilts can be easily determined by detecting the position of the accessory on one of the images.

If the reference system is obtained differently, for example by identification of singular points of the face, these angles can be determined in accordance with the methods forming the subject of the documents WO2011/161087 or FR 2 860 887 in the name of the Applicant.

The invention claimed is:

1. A method for automatic determination of parameters of spectacles comprising the following steps:
   S1: acquisition of a first image of a frame of the spectacles from a first viewing angle;
   S2: acquisition of a second image of the frame from a second viewing angle, the first viewing angle being different from the second viewing angle;
   S3: identification of visual markers in the first image and in the second image and deduction of a reference system related to the visual markers;
   S4: determination of an element of the frame;
   S5: definition of an initial model of the frame in the reference system based on a set of predefined initial parameters;
   S6: definition of a region of interest including the element of the frame in the initial model,
   S7: projection of the region of interest into the first image and into the second image to obtain first and second projected images;
   S8: comparison of the first and second projected images and evaluation of a similarity between the first and second projected images;
   S9: modification of at least one of the parameters of the initial model to obtain a modified model in the reference system;
   S10: application of steps S6 to S9 to the modified model until a maximum of similarities is obtained between the projected images; and
   S11: deduction of parameters of the modified model associated with the first and second projected images having the maximum of similarities.

2. The method as claimed in claim 1, wherein step S8 is carried out by comparison of gradients in the first and second projected image, for example using a Sobel filter so as to obtain two filtered images, the two filtered images being then compared by summing squares of pointwise differences or by computing a correlation by taking a pointwise product.

3. The method of claim 1, wherein the element of the frame comprises a bridge and the at least one of the parameters modified in step S9 corresponds to a translation in the reference system of the initial model or of the modified model along an axis substantially normal to a sagittal plane of a head of a subject wearing the spectacles or along an axis substantially normal to a coronal plane of the head of the subject, wherein the first image and the second image are acquired during steps S1 and S2 by two image acquisition devices, an optical axes of the image acquisition devices forming a non-zero angle with a plane of symmetry of the frame, for example an angle of +10° and of −10°, respectively.

4. The method of claim 3, wherein, when the at least one of the parameters correspond to a translation in the reference system of the initial model or the modified model along an axis normal to a sagittal plane, the method further comprises, prior to step S8, a step of transformation of the second projected image by application, to the second projected image, of an axial symmetry with respect to a plane normal to the second image and passing through a center of the second image so as to obtain a mirror projection, the comparison step S8 being then applied to said mirror projection.

5. The method of claim 1, wherein the visual markers comprise targets attached to an accessory joined with the frame and, during step S9, the at least one of the parameter comprises a single parameter, which corresponds to a translation along an axis of the reference system.

6. The method of claim 1, wherein the element of the frame comprises a left lug or a right lug and the at least one of the parameters are chosen so as to modify an inclination of the region of interest with respect to a plane tangent to vertical segments of a boxing rectangle of one of the corrective lenses, wherein the first image is acquired during step S1 by a first image acquisition device, an optical axis of the image acquisition device being substantially contained in a sagittal plane of a head of a subject wearing the spectacles and the second image is acquired during step S2 by a second image acquisition device, an optical axis of the second acquisition device forming a non-zero angle with a plane of symmetry of the frame, for example an angle of 10°, and wherein the second image acquisition device is preferably positioned with respect to the plane of symmetry so as to be closer to the lug determined as an element of the frame in step S4 than to the other lug of the frame.

7. The method of claim 1 wherein:
steps S1 to S11 are first implemented on an element of the frame comprising a bridge of the frame, the at least one of the parameters corresponding to a translation in the reference system of the initial model or the modified model along an axis substantially normal to a sagittal plane of a head of a subject wearing the spectacles or along an axis substantially normal to a coronal plane of the head; and then
steps S1 to S11 are implemented over an element of the frame comprising a lug of the frame, the at least one of the parameters of the modified model are chosen so as to modify an inclination of the region of interest with respect to a plane tangent to vertical segments of a boxing rectangle of a lens of the spectacle.

8. The method of claim 1, further comprising a step of detection of a contour of the frame in the first and second projected images so as to determine parameters of a boxing rectangle of a lens of the spectacle.

9. The method of claim 8, wherein:
the first image and the second image are acquired using a first image acquisition device and a second image acquisition device, respectively, the first image acquisition device and the second image acquisition device each forming a different angle with a plane of symmetry of the frame, the first image acquisition device being closer to a left lug of the frame and the second image acquisition device being closer to a right lug of the frame; and the step of detection of a contour comprises a sub-step of detection of at least one of a right internal contour of the frame and a right external contour of the frame in the first projected image and a sub-step of detection of the at least one of the left internal contour of the frame and the left external contour of the frame in the second projected image, respectively.

10. The method as claimed in claim 9, further comprising, following the step of detection of the contour, a step of deduction of a position, in the reference system, of at least one of internal vertical segments and external vertical segments of boxing rectangles of lenses of the spectacles.

11. The method of claim 1, further comprising, prior to step S3, an additional step during which at least a third image of the frame is acquired, wherein the at least one third image of the frame may be acquired from a same point of view as at least one of the first image and the second image or from a different point of view than the first image and the second image, steps S3 to S11 being then implemented on the first image, on the second image and on the at least one third image.

12. The method of claim 1, wherein the first image is acquired using a first image acquisition device, the second image is acquired using a second image acquisition device, one of the first and the second image acquisition devices being closer to the ground than another of the first and second image acquisition devices.

13. The method of claim 1, wherein the parameters of the modified model determined in step S11 define a boxing rectangle of a lens of the frame, the method further comprising determination of a shape of the lens based on said parameters of the modified model.

14. The method of claim 13, wherein the step of determination of the shape of the lens comprises the following sub-steps:
normalization of the shape of the lens based on the parameters defining the boxing rectangle; and
definition of a parametric model of the normalized shape of the lens, wherein the parametric model may be defined by at least one of the following methods: principal component analysis, determination of a Fournier transform, splines, B-spline, non-uniform rational B-splines; wherein the shape of the lens may be determined according to the following sub-steps:
projection of a region of interest corresponding to all or part of a contour of the normalized shape of the lens defined by the parametric model in the first image and the second image;
evaluation of a similarity between each point of the projection of the region of interest into the first image and the second image and a contour in said first and second image, respectively;
modification of at least one parameter of the parametric model;
reiteration of the steps of projection and evaluation until a maximum of similarity is obtained between the projection of the region of interest into the first image and/or into the second image and the contour; and
deduction of the at least one of the parameters of the parametric model corresponding to the contour.

15. A method of automatic determination of a contour of a spectacle lens, said method comprising the following steps:
(i) acquisition of at least one image of the spectacle lens;
(ii) implementation of the steps of the method of claim 1 to determine a boxing rectangle of the spectacle lens in said image, said boxing rectangle comprising at least one dimension corresponding to a width of the boxing rectangle and one dimension corresponding to a height of the boxing rectangle;

(iii) definition of a parametric model of the contour of the lens;

(iv) projection in the image of a region of interest corresponding to all or part of the contour defined by the parametric model, (v) evaluation of a similarity between each point of the projection of the region of interest in the image and a contour in said image;

(vi) modification of at least one parameter of the parametric model;

(vii) reiteration of steps of projection and of evaluation until a maximum of similarity is obtained between the projection of the region of interest and the contour; and (viii) deduction of the at least one of the parameters of the parametric model corresponding to the contour of the lens.

16. A device for automatic determination of parameters spectacles comprising:

a first image acquisition device configured to acquire a first image of a frame of the spectacles from a first viewing angle;

a second image acquisition device configured to acquire a second image of the frame from a second viewing angle, the first viewing angle being different to the second viewing angle;

means of identification, in the first image and in the second image, of visual markers and deduction, for each image, of a reference system related to these visual markers;

means of determination of an element of the frame, means of definition of an initial model of the frame in the reference system based of a set of predefined initial parameters, means of definition of a region of interest including the element of the frame in the initial model means of projection, into the first image and into the second image, of the region of interest into the first image and into the second image to obtain first and second projected images; means of comparison of the first and second projected images and of evaluation of a similarity between the first and second projected images;

means of modification of at least one of the parameters of the initial model to obtain a modified model in the reference system;

means of application of steps S6 to S9 to the modified model until a maximum of similarities is obtained between the projected; and means of deduction of parameters of the modified model associated with the first and second projected images having the maximum of similarities.

17. A system comprising the determination device of claim 16 and targets attached to an accessory joined with the frame, the visual markers comprising the targets.

* * * * *